US007002459B1

(12) United States Patent
Escandón

(10) Patent No.: US 7,002,459 B1
(45) Date of Patent: Feb. 21, 2006

(54) INTEGRAL VEHICLE BRAKE INDICATOR

(75) Inventor: Fernando J. de la Fuente Escandón, Madrid (ES)

(73) Assignee: Fuesca, S.L., Madrid (ES)

( * ) Notice: Subject to any disclaimer, the term of this patent is extended or adjusted under 35 U.S.C. 154(b) by 81 days.

(21) Appl. No.: 10/009,253

(22) PCT Filed: Jun. 1, 2000

(86) PCT No.: PCT/ES00/00195

§ 371 (c)(1),
(2), (4) Date: Mar. 27, 2002

(87) PCT Pub. No.: WO00/76817

PCT Pub. Date: Dec. 21, 2000

(30) Foreign Application Priority Data

Jun. 10, 1999 (ES) .................................... 9901294

(51) Int. Cl.
*B60Q 1/50* (2006.01)

(52) U.S. Cl. ...................... 340/467; 340/464; 340/468; 340/469; 340/425.5; 340/479

(58) Field of Classification Search ................ 340/467, 340/479, 464, 468, 903, 469, 425.5
See application file for complete search history.

(56) References Cited

U.S. PATENT DOCUMENTS 3,634,792 A * 1/1972 Blomenkamp et al. ..... 340/464
4,556,862 A * 12/1985 Meinershagen ............. 340/478
4,959,634 A * 9/1990 Miller ........................ 340/467
5,818,332 A * 10/1998 Chen .......................... 340/441
5,838,259 A * 11/1998 Tonkin ....................... 340/903
6,020,814 A * 2/2000 Robert ....................... 340/467
6,426,706 B1 * 7/2002 King .......................... 340/903
6,525,652 B1 * 2/2003 Smith ...................... 340/425.5

FOREIGN PATENT DOCUMENTS

| | | |
|---|---|---|
| AU | 2708292 | 4/1993 |
| DE | 3907714 | 9/1990 |
| DE | 19508416 | 9/1996 |
| DE | 19513514 | 10/1996 |
| ES | 2019723 | 7/1991 |
| ES | 2025999 | 4/1992 |
| ES | 2064174 | 1/1996 |
| FR | 2688593 | 9/1993 |
| GB | 2319124 | 5/1998 |

OTHER PUBLICATIONS

English Translation of DE 195 08 416 Dated Sep. 12, 1996.
English Translation of DE 39 07 714 Dated Sep. 20, 1990.
English Translation of DE 195 13 514 Dated Oct. 17, 1996.

(Continued)

*Primary Examiner*—Daniel Wu
*Assistant Examiner*—Tai T. Nguyen
(74) *Attorney, Agent, or Firm*—Ladas & Parry LLP

(57) ABSTRACT

Integral vehicle braking indicator. Comprises an electronic system for processing actual speed signals and engine revolutions signals and a segment of lights which through proportionality (controlled by the electronic system) between the vehicle's actual speed loss and the number of lights located in the rear part of the vehicle which light up (comprising the entire segment) and the rate at which they do conveys to other drivers rapid information on actual loss of speed as a result of action on the braking system or sudden slowing of the engine, the type of braking being applied (fierce or progressive) and whether at the end the vehicle is moving or stationary.

7 Claims, 1 Drawing Sheet

OTHER PUBLICATIONS

English Translation of FR 2688593 Dated Sep. 17, 1993.
English Translation of ES 2019723 Dated Jul. 1, 1991.
English Translation of ES 2064174 Dated Jan. 1, 1996.
English Translation of ES 2025999 Dated Apr. 1, 1992.

* cited by examiner

INTEGRAL VEHICLE BRAKE INDICATOR

FIELD OF THE INVENTION

This invention relates to a system for indicating braking by a vehicle, comprising an electronic system for processing actual speed and engine revolutions signals and a segment of lights which as a result or proportionality (controlled by the electronic system) between the vehicle's actual loss of speed and the number of lights and the speed with which they light up (convergently or divergently) in two segments of lights (making up the whole segment) located in the rear part of the vehicle provides other drivers with rapid information on the actual loss of speed as a result of action on the braking system or rapid slowing of the engine, the type of braking being performed (sudden or progressive) and whether at the end the vehicle is moving or stationary.

DESCRIPTION OF THE PRIOR ART

Braking systems have developed greatly since the time when the motorcar was invented to offer greater effectiveness and safety. However, comparatively speaking, braking indicators have not developed in parallel.

From the mechanical point of view the task of a vehicle's braking system is to control or slow down its forward movement and the brake lights indicate to other drivers that the system has been operated. However in some vehicle mechanical or drivers' manuals the following concept is expressed in various ways: "the best brake for a vehicle is its engine", which applies when descending long gradients as well as in other situations (entering or leaving bends, assisting braking, loss of braking system, etc.), and as far as other drivers are concerned this type of braking (which can give rise to a sudden lose of speed) can only be assessed subjectively by the relative change in the positions of the vehicles.

Existing vehicle braking indicators on the other hand are limited to giving other drivers notice of the fact that the braking system has been activated, but they do not indicate with what intensity this has been done, and therefore provide no information about the effective drop in speed produced, or the time in which this occurs (fierce or gentle braking), or whether at the end the vehicle is moving or stationary.

With both types of braking and possible combinations of the two the problem is that the information which is received about the vehicle's actual loss of speed and whether at the end it is in motion is insufficient, subjective and in many cases late.

Under certain visibility conditions (fog) brake lights have to be increased in brightness in order to be at least visible, as do the side lights when these are operating on the fog setting.

Also when environmental illumination (or the headlamps of the vehicle behind) is very bright at the rear of the vehicle, perception of the intensity of the brake lights is enormously reduced.

Finally, in some road configurations and at some distances observation of a vehicle whose brake lights are lit does not provide any indication whether the said vehicle is moving or stationary, and therefore what change in speed should be made; only a subjective appreciation of the speed with which the relative change in positions occurs provides an idea, in many cases a late idea, of whether the other vehicle is moving or stationary, and this frequently causes vehicles to approach too closely.

Patents P8903390, P0531328, P9100875, P9002441 and others which relate to braking indicators which use intermittent flashing, flashing stop lights, changes in the brightness or rhythm of the brake lights in proportion to deceleration, indicators which memorize the initial braking force applied, and various systems to detect sudden accelerations and decelerations, are known.

None of these patents takes a combined view of the problem of the detection and transmission of all braking parameters, possible forms of braking, whether the vehicle is at the end moving or stationary, the way information on environmental conditions is transmitted and the ways of conveying this and the criteria applicable to it differ substantially in nature.

DESCRIPTION OF THE INVENTION

This patent offers a solution for conveying necessary information to other drivers in any type of braking and under any environmental or lighting conditions, providing information on the loss of speed which the braking system or slowing of the engine produces, the speed with which this occurs (whether the braking is fierce, gentle or total) and the final condition of the vehicle (travelling or stationary), in a rapid and easily understandable way.

The magnitude of a vehicle's speed loss depends on the speed at which it is travelling at the moment braking is applied (slowing 10 kph when travelling at 120 kph on a motorway is not as significant as dropping this speed when travelling in town or in a queue at 50 kph), and the rate at which this slowing takes place (indicating whether the braking is fierce or progressive).

The various systems for obtaining a signal from a change in a vehicle's speed and changes in engine rpm are not regarded as being relevant in this patent, given the ease and the large number of possibilities available for providing them in any existing vehicle, for example:

- The wheel speed signal can be obtained: from the ABS system, from an optical reader, or by installing any of the many systems which enable us to know the wheel speed (rotameters, May effect, anemometers, etc.).
- Likewise the rpm signal from the engine can be obtained: from the alternator, rev counter, sparking coil, optical reader, intake anemometer, etc.

The system indicating braking comprises a total segment (of the width of the rear of the vehicle's coachwork or its rear window) which may have a fixed zone which initially lights up at each end (regardless of the drop in speed and the type of braking) as soon as force is applied to the brake pedal or the engine is slowed, which is independent of the braking parameters (it acts like a conventional brake light), and on either side a segment which lights up in proportion to the braking parameters, which is controlled by a microprocessor through a braking program.

In the centre point of the total segment a reflector or any type of indicator (or the environmental light sensor itself) occupies the centre of the display.

As the wheels lose speed (as a result of action on the braking system or slowing of the engine), as well as the ends of the total segment lighting up instantaneously lights light up in proportion to the loss of speed, their number and the rate at which they light up varying with the loss of speed during braking.

The rate at which the lights light up away from (or towards) the central indicator is directly proportional to the actual rate at which speed is lost by the vehicle per unit time and the number which light up is proportional to the actual loss of speed as an absolute value.

The rate at which the lights light up and the number which light up provide rapid information about the rate at which speed is being lost and what final speed is reached (in comparison with the travelling speed), and therefore the loss of speed until the vehicle is completely stationary.

If the lights light up slowly towards the centre (or form the centre towards the edges), the rate at which speed is lost is slow in comparison with the speed at which the vehicle is travelling and progressive (gentle braking); if in addition to this the number of lights which light up is few, this indicates that the speed reduction is small (again in comparison with the speed at which the vehicle was travelling).

If the lights light up rapidly towards the centre (or away from the centre towards the edges) this means that the loss of speed is rapid in comparison with the speed at which the vehicle is travelling (fierce braking) and if the number of lights which light up is large, this means that the reduction in speed is also rapid (again in comparison with the speed at which the vehicle was travelling).

If all the lights light up this means that the vehicle is stopped or that braking has locked the wheels (total braking).

The warning lights remain lit while force is applied to the brake pedal and the system acts with a delay, as far as extinguishing of the lights is concerned, so that if the brake pedal is operated repeatedly the system responds to the initial conditions (and not to each of the instantaneous speeds corresponding to each braking pulse).

The braking indicator system is controlled by a microprocessor which reads the signal provided by a analog to digital converter when indicating the interruptions generated by the brake pedal or the engine rpm derivative sensor and is supplemented with an environmental light sensor which (through the LED driver) establishes the brightness of the light emitted in a directly proportional way when indicating braking, and a switch, in the event of fog, which disconnects the environmental light sensor and ensures maximum brightness from the braking indicator lights.

BRIEF DESCRIPTION OF THE DRAWING

The sole FIGURE of the drawing is a diagrammatic illustration of one embodiment of a braking indicator system according to the invention.

DETAILED DESCRIPTION

Figure 1:
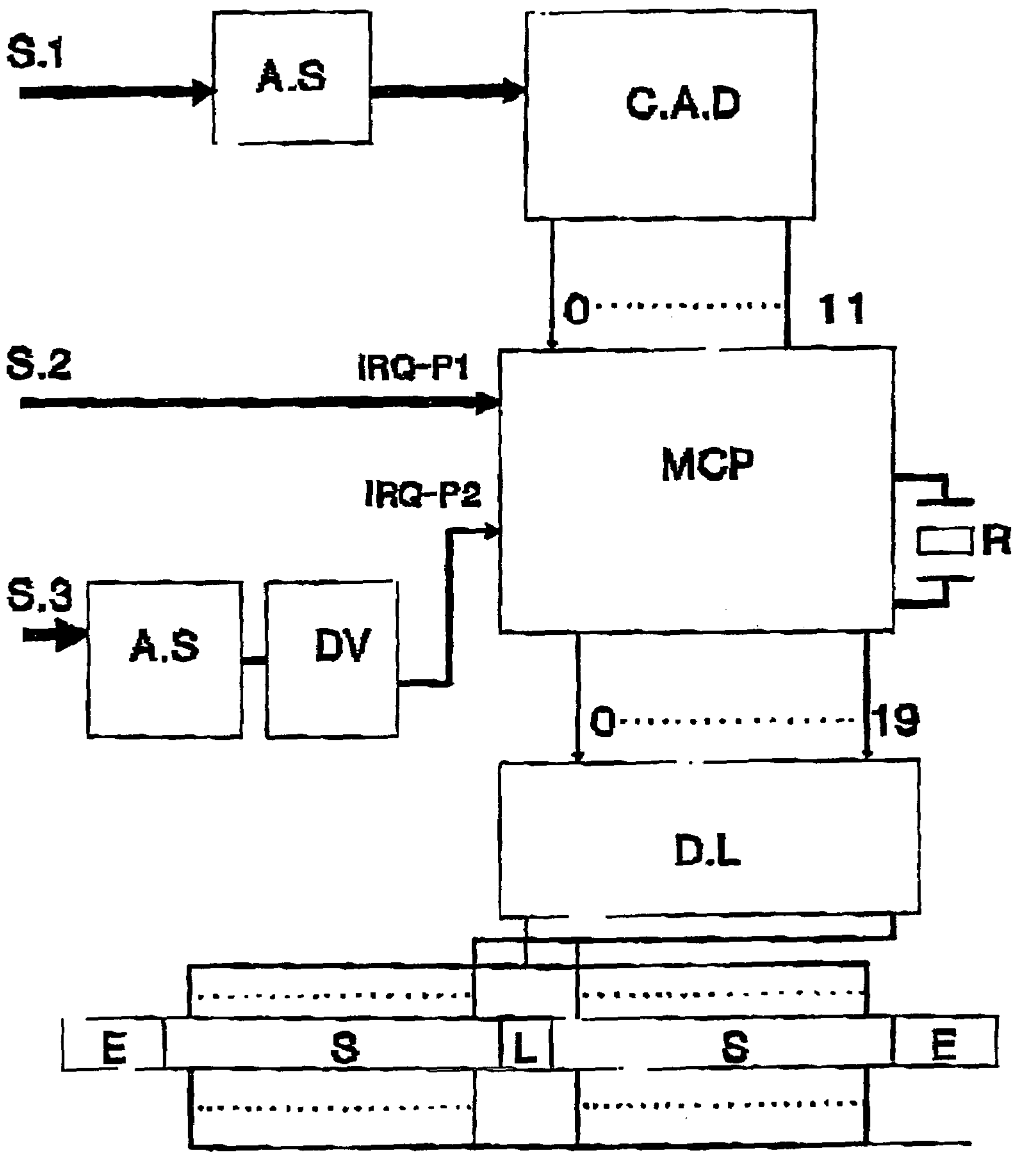

The following elements are illustrated in the drawing.

S-1=Wheel speed signal
S-2=Brake pedal signal
S-3=Engine rpm signal
A.S—Signal conditioners
DV=Derivative sensor
IRQ-P1=Priority 1 interruption
IRQ-P2=Priority 2 interruption
C.A.D.=Analog-digital converter
MCP=Microprocessor
R=Clock
D.L.=LED drivers
E=Non-proportional illumination zone
L=Reflector or environmental light sensor
S=Zone in which lighting is proportional to the braking parameters If the system is stationary, acting on the brake pedal produces the highest priority interruption (IRQ P1) for the microprocessor (MCP) as a result of which the analog signal (S.1) which is proportional to the wheel speed which continually passes through the signal conditioning circuit (A.S.) and is converted into digital by the analog-digital converter (C.A.D.) is read by the microprocessor (MCP) and processed in accordance with the "braking indication" program, lighting up the LED in the fixed lighting zones (E) and through the LED driver the LEDs (S) corresponding to the loss of speed which is produced, in accordance with the set determined by the initial speed.

If the system is stationary a signal is produced from the derivative (DV) to produce an instantaneous engine revolutions peak when action is taken on the gearbox, this giving rise to a lesser priority interruption (IRQ-P2) in the microprocessor (MCP) as a result of which this reads the digital wheel speed signal coming from the analog-digital converter (C.A.D.) and processes it in accordance with the "braking indication" program and cuts off the indication when the wheel speed increases or remains constant.

The "braking indication" program acts in the same way in both cases, so that for example if the variably lit part (S) of each segment of the vehicle's lights comprises 20 lights and the vehicle is travelling at 120 kph, when action is taken on the braking system or slowing is effected through the gearbox the program causes the two fixed end lights (B) in each segment to light up at the same time as establishing the set which lights up corresponding to this speed (120 kph), the sensitivity of progression in this act being obtained by dividing the instantaneous speed read from the number of LEDs in each segment (20) and processing the continuous signal received from the analog-digital converter (C.A.D.) in relation to this sensitivity, this determining the number of lights which light up and the speed at which they do so in such a way that the lights in the variable zone (S) light up as the speed during braking passes through 114, 108, 102, . . . , 12, 6 and 0 kph (if all the 20 lights in each segment light up, that is the total segment is illuminated, this means that the vehicle is wholly stationary).

The sensitivity which can be imparted to the system depends only on the number of lights forming each segment (the more lights per segment, the more sensitive to changes in speed).

Whenever action is taken on the braking system the microprocessor (MCP) selects the series which light up corresponding to the initial speed at that moment, but the system switches off the signal provided when action on the brake pedal ceases, with a specific delay (i.e. 3 seconds). In this way, if the foot is lifted off the brake pedal for a few moments and then pressed down again, all the lights which were lit before the brake pedal was released will remain lit and those corresponding to the subsequent loss in speed which occurs during those and subsequent moments will light up.

If the wheel speed is zero, operating the braking system will light up all the lights, in both the fixed zone and the two segments.

The brightness of the light emitted by the LEDs (E and S) is controlled by the environmental light sensor (L) and the LED driver (D.L.) in a way which is directly proportional to the environmental lighting conditions.

A switch can be used to switch off control by the environmental light sensor and set all lights (E and S) to maximum brightness in the event of fog.

What is claimed is:

1. A vehicle braking indicator system located in the rear part of a vehicle, comprising an electronic controller for processing actual vehicle speed and engine rpm signals and a segment of lights connected to the electronic controller such that a number of lights are lit up proportional to actual loss of speed of the vehicle whereby the number of lights and the rate at which the lights progressively light up conveys rapid information to other drivers on the actual loss of speed as a result of action on a braking system of the vehicle and sudden slowing of the engine, and whether the braking is, intense or progressive, and whether at the end of braking the vehicle is moving or stationary, wherein the number of lights of said segment which are lit is inversely proportional to vehicle speed, wherein the electronic controller comprises a microprocessor with a vehicle braking indication program that processes the vehicle speed signal when the braking system is activated in such a way that instantaneous speed read is allocated to a number of lights in each part of said segment and accordingly the lights in the two parts light up progressively as the speed of the vehicle changes during braking and the microprocessor is also triggered by a signal from a derivative circuit from the engine RPM signal.

2. Vehicle braking indicator according to claim 1, wherein said segment of lights is divided into two equal parts with a fixed number of lights which converge or diverge to or from the center thereof when in operation.

3. Vehicle braking indicator according to claim 1, wherein brightness of the lights which light up in each segment is controlled by an environmental light sensor in a directly proportional manner.

4. Vehicle braking indicator according to claim 3, wherein a switch is used to disconnect the environmental light sensor and apply maximum brightness to the lights which light up.

5. Vehicle braking indicator according to claim 1, wherein the signal reached during the entire braking time is switched off with a specific delay when force ceases to be applied to the brake system.

6. Vehicle braking indicator according to claim 1, wherein the segment which lights up in a variable way may incorporate a zone which always lights up independently of the braking signals.

7. Vehicle braking indicator according to claim 1, wherein when the vehicle is at rest and the vehicle speed signal is zero, action on the braking system produces signals by the electronic controller to light up all of the lights of the light segment.

* * * * *